Figure 1:
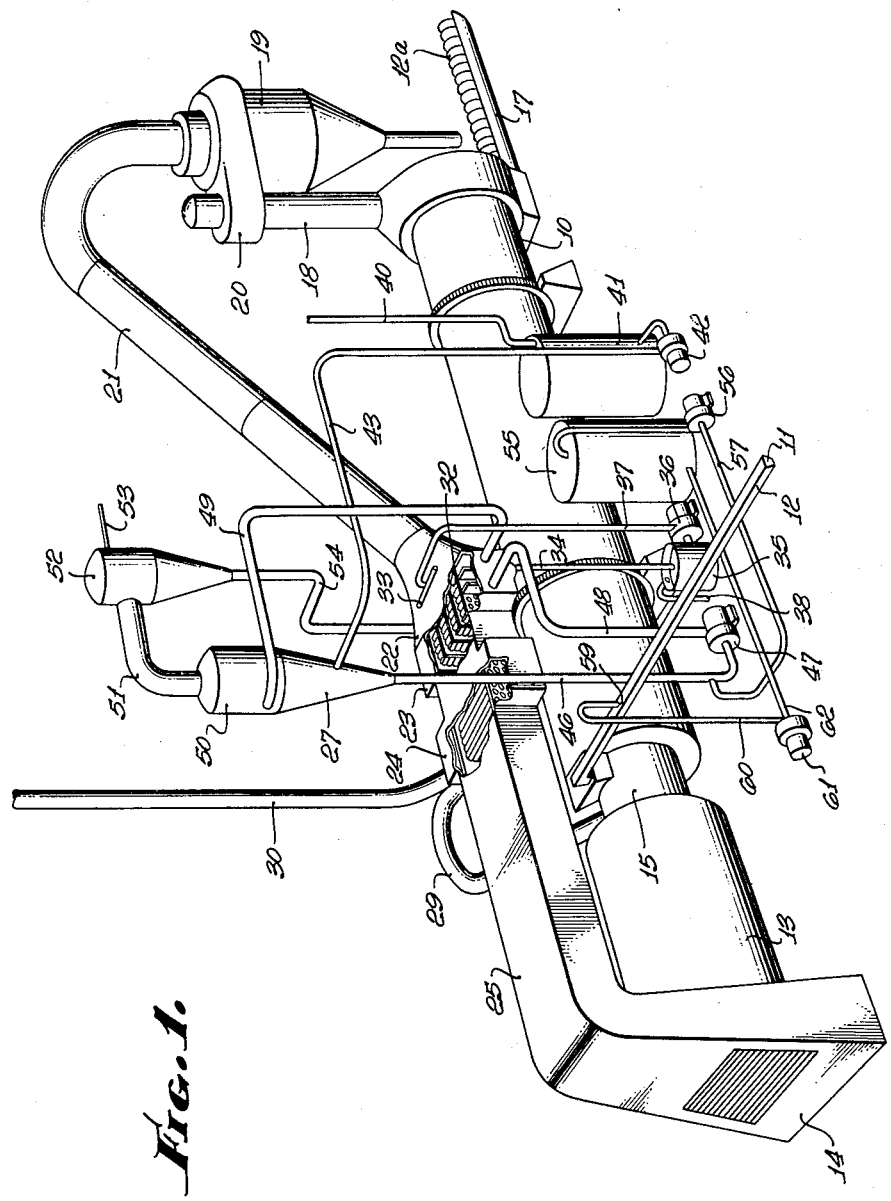

April 28, 1964  R. T. ERICKSON  3,131,035
METHOD OF HEAT RECOVERY FROM WASTE GASES CONTAINING VAPOR
Filed Nov. 25, 1960  2 Sheets-Sheet 2

INVENTOR.
REGINALD T. ERICKSON
BY
Miketta and Glenny
ATTORNEYS.

United States Patent Office 3,131,035
Patented Apr. 28, 1964

3,131,035
METHOD OF HEAT RECOVERY FROM WASTE
GASES CONTAINING VAPOR
Reginald T. Erickson, P.O. Box 323,
San Juan Capistrano, Calif.
Filed Nov. 25, 1960, Ser. No. 71,813
2 Claims. (Cl. 34—77)

Generally speaking, this invention relates to a means and a method of utilizing heat from waste gases containing vapors in various industrial processing of materials in solid and liquid phases, as by drying and concentrating. More particularly, the invention relates to the recovery of heat from waste or exhaust gases containing water vapors derived from the drying of materials and the further utilization of such heat in another portion of the same process in which a liquid is to be concentrated or in a different process and for other purposes.

Solid materials are often processed as by drying to remove or reduce their moisture content. Drying may be accomplished by the use of various types of drying means, including direct and indirect fired air dryers, steam heated dryers and the like. In such drying devices the moisture removed from the solid material and the products of combustion are often discharged to atmosphere. Such discharge of hot waste gases and vapors not only results in a substantial amount of heat being discharged and lost to atmosphere but also results in an increase in air pollution. In some instances waste gases from such drying devices are used to heat other phases of a process, but in such prior proposed uses known to me the moisture or vapor content of the waste gases was first removed or reduced to a minimum before the heat in the waste gases was utilized. In still other proposed drying processes a vapor-containing waste gas from a high temperature dryer has been brought into direct intimate contact with a liquid and upon condensation of the vapors in the waste gas the latent heat of the vapors produced an increase in the temperature of the liquid, such heated liquid then being used for other purposes.

The present invention contemplates a process whereby the available heat in such waste gases and vapors contained therein is saved and utilized in an efficient, effective manner. In accordance with the present invention water vapor present in hot waste gases discharged from a drying means is used in order to supply heat to and to fire an evaporator means. Such an evaporator means used in accordance wtih the present process may be operated at or below atmospheric pressure depending upon the conditions of treatment of the material being processed. The process of the present invention therefore contemplates the recovery of heat from waste gases and vapor contained therein and the utilization of such heat to operate a portion of a process for drying and concentrating materials in solid and liquid phases. It will be understood that the invention contemplates a novel method and means for drying and concentrating materials in which a drying means and one or more evaporator means may be cooperably associated for treatment of materials in solid and liquid phases.

One of the important advantages of the present invention is that the method by which heat is obtained from the vapors and waste gases results in reduction of particles of combustion carried by the waste gases and wherein the recirculation of the waste gases with substantially all of the vapor content removed therefrom further results in removal of objectionable solid particles and odors in waste gases discharged to atmosphere and reduction thereby of atmospheric contamination or air pollution.

Another advantage of the present invention is that heat savings can be accomplished in connection with certain processes in which the invention may be practiced whereby the necessity for additional heating devices such as additional steam units and the like is either reduced or eliminated.

The primary and broad object of the present invention is to disclose and provide a novel method and means for the recovery and utilization of heat in gases normally considered as waste gases and which are usually discharged to atmosphere.

An object of the invention is to disclose and provide a means and method for recovering heat from vapor bearing waste gases in such a manner that the recovered heat may be used in another part of a material treatment process.

A still further object of this invention is to disclose and provide a means and method for recovering and utilizing heat from a dryer means in which solid materials are being treated to fire or to heat an evaporator means in which liquid materials are being treated.

A still further object of the invention is to disclose and provide a means and method for utilization of heat in vapor-containing waste gases wherein substantially oxygen-free atmosphere may be provided in the dryer means for reduction of material in solid form or phase.

A still further object of the invention is to disclose and provide a novel apparatus for use in firing or heating a portion of an evaporator cycle by heat from waste gases from a dryer means.

Generally speaking, the method of the present invention may be employed in a process of rendering material in solid and liquid phases in which a dryer means is employed to subject the materials in solid phase to heat to reduce the moisture content thereof and wherein materials in liquid phase are subjected to concentration, as by evaporator means, to recover certain components in the liquid phase. The method of the present invention includes passing waste gases containing vapors discharged from the drying of the solid material along a path of a heat-exchange means. Prior to contact of the waste gases with the heat-exchange means, the waste gases and vapor contained therein may be scrubbed with condensate derived substantially from the vapors contained in said waste gases and collected from the wetting of the walls of the heat-exchange means. The waste gases, after contacting the heat-exchange means, are circulated back to the drying means for re-introduction thereinto for several purposes, as later described. The heat-exchange means provides a path for flowing of the liquid material phase in contact with heat-exchange walls of the heat-exchange means in indirect heat-exchange relation to the waste gases whereby the liquid material phase is subjected to heating. The heated liquid material phase may then be conducted to and passed through an evaporator means which may be maintained under subatmospheric pressure whereby the evaporator means is sufficiently fired by the heat in the heated liquid material phase for initially concentrating the liquid material phase.

Many other objects and advantages of the present invention will be readily apparent from the following description and drawings in which exemplary embodiments of the invention are shown.

Figure 2:
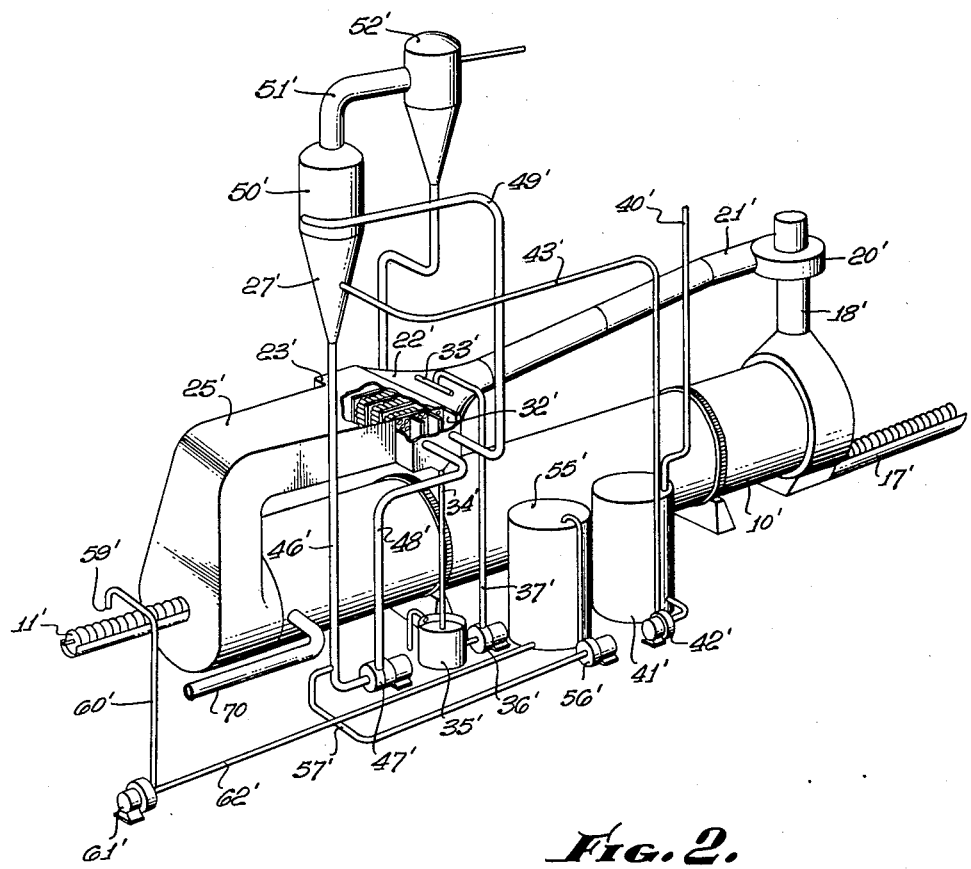

In the drawings:

FIG. 1 is a diagrammatic view of a system embodying the method of the present invention, and wherein the drying device is a direct-fired air dryer; and FIG. 2 is a diagrammatic view of a system showing a different embodiment of the process of the present invention in which the drying device includes a steam dryer.

While the method of the present invention may be practiced in industrial processing of materials of various types and kinds, the invention is herein described in connection with a process for treatment of materials in liquid and solid phases. In such an exemplary process, the liquid material phase may be obtained from the material being treated as by pressing, screening, centrifuging or other methods for separating solids from liquids.

In the treatment of the solid material phase (in which the solid material may be in any preselected condition such as granular, cake, precooked and the like) a drying system is provided for removing moisture from the solid material. In the example, the drying system may include a direct fired air dryer means 10 of conventional design and make and to which solid material 11 may be fed at the inlet end of the dryer means by a screw conveyor 12 or other suitable conveying and feeding means. An air heating means 13, such as a furnace of well known make, may be fired by a gas or oil burner device 14 and an interconnecting passageway means 15 may be provided between the heating means 13 and the dryer means 10. The opposite end of the dryer means 10 may be provided with an outlet opening for passage therethrough of the dried solid material 12a after it has been moved at a preselected speed through the drying means by a conveyor means (not shown) of well known manufacture. The discharged dried material 12a may be conveyed from the dryer means 10 in any suitable manner, as by a conveyor indicated at 17.

The heated air from the heating means 13 after tempering, as later described, is passed through the dryer means 10 and permitted contact with the solid material moving through the drying means 10 and such heated air becomes laden with water vapor from the solid material being dried. At the discharge end of the dryer means 10 the gases discharged therefrom into exhaust pipe 18 may thus include normal products of combustion, excess air, water vapor, gases from the material being dried, and entrained dry solid particles. This exhaust or waste gas at a predetermined temperature (for example, 230° F.) is directed to a cyclone 19 of conventional construction by a suitable blower or fan 20. In the cyclone 19 the entrained dry solid particles are substantially removed from the exhaust or waste gas.

At this point in the drying system it has been the usual prior practice to exhaust the waste gases including water vapors, excess air and products of combustion to atmosphere. It will be apparent that upon such discharge to atmosphere the heat content of the water vapor formed in the dryer is lost, the heat content of the water vapor formed by burning of hydrogen in the fuel is lost, and there is a dry gas heat loss equal to the difference in heat content of the air entering the dryer as combustion air to the burner and additional temporary air admitted. In the event the waste gases are recirculated to the burner and dryer then heat loss occurs in the latent heat of vapor formed in the dryer, latent heat of water vapor formed by burning of hydrogen in the fuel, and a dry gas heat loss equal to the heat content of the combustion air plus any air entering the recirculation cycle and the heat content of the air which must be removed from the cycle to maintain proper heat balances.

In accordance with the present invention, such heat losses are avoided and the waste gases are not discharged to atmosphere nor are they simply recirculated back to the burner and dryer means. Recirculation of waste gases in accordance with the present invention is for the purpose of removing products of combustion and any vapors and gases formed by the drying process. Waste gases discharged from cyclone 19 may be passed along duct 21 first to a gas scrubbing means 22, then to a heat-exchange means 23, then to a second heat-exchange means 24, and then the waste gases are conveyed by duct 25 to the burner means 14 and introduced to the furnace or incinerator means 13.

Before describing the relationship of heat-exchange means 23 to the concentrating system for the liquid phase which includes evaporator means 27, further treatment of the waste gases will be described. Briefly, it will be understood that the scrubbing means 22 serves to remove a selected amount of superheat carried by the waste gases through the tube 21, to remove additional solid particles carried by the gas, and to also remove certain products of combustion in the gas. Waste gases discharged from the heat-exchange means 23 are substantially vapor-free and clean.

These dry gases are then passed through the second heat-exchange means 24 which is operated at high temperature by furnace or incinerator gases drawn from the discharge end of the furnace 13 and passed through tube 29 to the heat-exchange means 24. The heat exchanger 24 may be of conventional horizontal tube type and the hot furnace gases may be passed through the tubes thereof and then discharged through stack 30 to atmosphere. The high temperature heat-exchange means 24 serves to preheat the dry waste gases which are recirculated to the furnace 13 as auxiliary, secondary or tempering gases and are incinerated in the furnace 13. It it important to note that the hot furnace gases passed through the high temperature heat exchanger 24 are drawn from furnace 13 before they enter the dryer means 10 so that the waste gases are subject to incineration. Odors picked up by air as it initially passed through dryer means 10 are incinerated in furnace 13 before a portion of the dry waste gases are passed to atmosphere through heat exchanger 24 and stack 30. Thus any gases discharged to atmosphere from the present system are virtually clean and contain only unobjectionable products of combustion from furnace 13. When the material being dried contains odoriferous components or other material components which upon drying may contribute to objectionable air pollution, it will be apparent that the waste gas treatment of the present system not only removes solid particles at the cyclone 19, washes and scrubs the waste gases at the scrubbing means 22, preheats dry waste gases at the high temperature heat exchanger 24 and then incinerates the preheated waste gases upon introduction to the furnace 13. Preheating of the dry waste gases at the high temperature heat exchanger 24 serves to conserve the remaining heat content of the dry waste gases and it will be apparent that heat losses in the dry waste gases have been substantially reduced.

As previously noted, the scrubber means 22 serves to wash and scrub waste gases and vapors discharged from duct 21. The scrubbing means 22 may include a scrubbing chamber 32 ahead of heat exchanger 23 and in which a spray pipe 33 is disposed for interposing a spray of water to the flow of waste gases in order to remove a selected amount of superheat and particulate matter therefrom. A drain pipe 34 at the bottom of chamber 32 provides flow of condensed vapors from heat-exchange means 23 and the spray water from chamber 32 to a collecting tank 35. A circulating pump 36 is connected to tank 35 and to spray pipe 33 by pipe 37. The collecting tank 35 may have an overflow pipe 38 leading to a waste drain or sewer means.

With the selected amount of superheat removed from the waste gases by the scrubbing means 22 condensate is formed on and at the heat-transmitting walls and surfaces of the heat-exchange means 23 and wets said walls and surfaces so that the latent heat of the vapor is given up to the walls and surfaces, thus facilitating the exchange of heat from the vapors and the waste gases to the liquid flowing through the tubes of the heat-exchange means 23. Thus the scrubbing and partial removal of superheat of the waste gases at a point immediately in front of the heat-exchange means 23 serves to afford a favorable condition at the heat-exchange means 23 for effective transfer of heat to the liquid passing therethrough.

In this example the liquid flowing through the heat-exchange means 23 may be a liquid extracted from the material being treated, the dry phase of which is being treated in the dryer means 10. It will also be understood that the liquid passed through heat-exchange means 23 may be an auxiliary liquid or other fluid which is to be heated. Thus the heat obtained from the waste gases and vapors may be saved and transferred to a liquid for use in some other part of the same process or a different process, if desired.

In this example the liquid, after being separated and extracted from the material, is supplied through a pipe 40 to a supply tank 41 and then may be pumped to evaporator means 27 by an evaporator feed pump 42 and through pipe 43 which may be connected to the evaporator 27 at a suitable selected point.

The evaporator 27 may be of any well known construction and type having a predetermined heating surface area and adapted to be operated at subatmospheric pressures. The evaporator 27 may be connected by pipe 46 to an evaporator circulating pump 47 which circulates through pipe 48 the liquid to and through the heat-exchange means 23 where heat from the waste gases is transferred to the liquid. Pipe 49 connects the evaporator means 27 to the heat-exchange means 23 and the heated liquid is introduced to the evaporator means 27 under subatmospheric pressure. At the selected subatmospheric pressure and at the selected temperature of the heated liquid sufficient heat is present to cause the liquid to vaporize in the evaporator flash chamber 50. Such vapor passes through conduit 51 to a condenser 52 which may be a barometric condenser. Cool water from a suitable source may be conducted by pipe 53 to the condenser 52 and the vapors condensed therein in well known manner. The condensate may be drained through pipe 54 to be disposed of in any suitable manner.

Means for collecting the finished liquid concentrate from the single evaporator means 27 may include a finished concentrate or liquid supply tank 55 connected to an evaporator discharge pump 56. A pipe 57 interconnects the pump 56 and the pipe 46 which is connected to the evaporator means 27. If desired, the concentrated liquid phase may be added to the solid or dry material phase by feeding the concentrate to the material being dried at 59 by means of a pipe 60 connected to a pump 61 which is connected through pipe 62 to the concentrate liquid tank 55. It will be understood that the addition of such concentrated liquid phase will vary the composition of the dry material 12a.

It will be understood that the firing of the evaporator means 27 under subatmospheric pressure by the heat saved from the waste gases and vapor requires predetermined heat balancing of the drying phase and the evaporator phase of the system. Under the exemplary system a selected heat balance may be provided in several ways, as by adjusting or modifying the area of the heating surfaces in the evaporator means 27, adjusting and modifying the heating surfaces of the heat-exchange means 24, modifying the absolute pressure under which the system is operated, installing multiple evaporator effects, and in some systems providing additional steam or heat for the evaporator means 27.

It will also be understood that in a direct fired air dryer in which the waste gases are recirculated substantially all of the heat in the waste gases and vapors is saved and utilized in the evaporator system and in the drying system. It will be noted that any heat that is not removed by the heat-exchange means 23 is returned to the dryer.

In the schematic diagram shown in FIG. 1, a direct-heated air dryer is shown. This invention contemplates that it may be practiced with an indirect-heated air dryer in which air is circulated in and around and through material being dried in an indirect heating relation. It will be apparent that in such indirect-heated air dryers that if the exhaust gases and vapors are discharged to atmosphere in usual manner the heat lost will include the heat content of the water vapor formed from the material being dried and a dry gas heat loss equal to the difference between the heat content of the air entering the dryer and the exhaust gases leaving the dryer. The arrangement of the heat-exchanging means 23 and scrubbing means 22, as described in the prior embodiment, may be employed with indirect-heated air dryers and in such systems where the waste gases are recirculated the use of the vented heat exchanger means 24 could be eliminated, no material would be discharged to atmosphere, and virtually all exhaust heat losses could be saved.

In FIG. 2 a schematic diagram of the process of this invention applied to a steam dryer arrangement is shown. In this embodiment of the invention like parts will be given like reference numerals wherever possible. It will be understood that the example of the invention shown in FIG. 2 embodies a dryer in which no air is used as a drying medium.

In FIG. 2 a dryer means 10' may be fed solid material to be dried by a suitable screw conveyer 11' and such material may be discharged from the dryer means 10' by a discharge conveyor 17'. The dryer means 10' may be heated by a suitable steam source (not shown) fed to the dryer means 10' through a suitable conduit 70. The steam in the dryer 10' heats the material fed to the dryer by contact with metal surfaces provided therefor in the dryer. The exhaust vapor is discharged through a duct 18' and may be propelled by a fan 20' through a conduit 21' to a scrubbing means 22' and a heat-exchange means 23' arranged in substantially the same manner as that shown in the prior embodiment. A duct 25' receives the exhaust vapors discharged from the heat-exchange means 23' and feeds such exhaust vapors to the inlet end of the dryer means 10'. The manner of operation of the scrubbing means 22' and the heat-exchange means 23' is substantially the same as that described in the prior embodiment.

The arrangement for feeding the liquid material phase to the evaporator means 27' is the same and comprises the supply pipe 40', the evaporator liquid supply tank 41', feed pump 42' and feed pipe 43'. The evaporator means 27' is connected to the pipe 46' which leads to the evaporator circulating pump 47' which is connected by pipe 48' to the heat-exchange means 23'. The heated liquid is conveyed by pipe 49' to the flash chamber 50' of the evaporator means 27' and the vapors may be conducted by duct 51' to a condenser 52'. The finished liquid concentrate may be collected in tank 55' through pipe 57' and the evaporator discharge pump 56'. As in the prior embodiment, liquid concentrate may be added to the solid material by means of a pump 61' connected by pipe 62' to the supply tank 55' and to the pipe 60' which discharges at 59' on the solid material entering the dryer means 10'. Also, as in the prior embodiment, the condensate from the scrubbing chamber 32' is drained by pipe 34' to a tank 35' and may be circulated by pump 36' through pipe 37' to the spray pipe 33'. It will be apparent that in the steam dryer system shown in FIG. 2 contamination of atmosphere is substantially eliminated because only a small amount of air is vented to atmosphere from the evaporator means 27'.

As in the prior embodiment it will be understood that the heat of the exhaust vapors passing through the scrubbing chamber 32' and through the heat-exchange means 23' will be utilized to heat the liquid phase flowing through the heat-exchange means 23' and since the evaporator means 27' is operating under subatmospheric pressure and with heat requirements properly calculated the evaporator means 27' may be fired solely from the heat recovered from the waste vapors discharged from the dryer means 10'.

It will be apparent that in the several systems described above the heat-exchanger means is used in the flow path of heated exhaust gases and vapors discharged from a drying means using air-fired dryers and steam and steam and fluid type dryers and that the heat of the exhaust gases and vapor are partially recovered by the heat-exchanger means and that the dry waste gases may be employed in a recirculating system so as to utilize the remainder of the heat therein and to incinerate the waste gases. It is important to note that the heat recovery side of the heat-exchanger means is associated with a system under sub-atmospheric pressure or vacuum and that in certain installations the heat recovered may be the sole means for firing an evaporator means in another part of the system. It will be understood that this method of heat recovery may be employed in various industrial processes such as paper processing, fish rendering processes and various other processes which involve the concentration of liquids.

While the method of the invention has been explained in relation to an evaporator means and heat exchange means associated therewith operating under subatmospheric pressure it will be understood that other heat transfer units such as a subatmospheric superheater may be employed.

It will be understood that various modifications and changes may be made in the process described above which come within the spirit of this invention and that all changes and modifications coming within the scope of the appended claims are embraced thereby.

I claim:
1. In combination with a process of rendering material in solid and liquid material phases in which the solid material phase is subjected to drying to reduce the moisture content thereof and the liquid material phase is subjected to concentration to recover certain components thereof, the steps of: passing gases containing vapors exhausted from the drying of the solid material phase along a path to a heat-exchange means having heat transmitting walls; scrubbing said exhausted gases prior to their contact with said walls with condensate derived substantially from said vapors contained in said gases to partially remove superheat thereof and wetting said walls with said vapor in said gases and said condensate; circulating gases from said heat-exchange means for reintroduction into and for further use in drying the solid material phase; passing the liquid material phase through the heat-exchange means in contact with said walls and in indirect heat exchange relation to said gases, whereby the liquid material phase is subjected to heating by heat recovered from said exhaust gases and vapor contained therein; and passing the heated liquid material phase into an evaporator under sub-atmospheric pressure for initial concentration of said liquid material phase, the heat from said liquid material phase serving to fire the evaporator.

2. In a process as stated in claim 1, the step of subjecting exhaust gases discharged from said heat-exchange means to heat from a second heat-exchange means which circulates burner gas provided for drying said solid material phase.

References Cited in the file of this patent

UNITED STATES PATENTS

| | | |
|---|---|---|
| 1,888,242 | Sholtes | Nov. 22, 1932 |
| 1,995,999 | Oman | Mar. 26, 1935 |
| 2,029,831 | Petersen | Feb. 4, 1936 |
| 2,427,302 | Reich | Sept. 9, 1947 |
| 2,451,692 | Pugh | Oct. 19, 1948 |
| 2,492,754 | Martin | Dec. 27, 1949 |
| 2,663,089 | Coats | Dec. 22, 1953 |
| 2,704,895 | Cederquist | Mar. 29, 1955 |
| 2,836,901 | Davis | June 3, 1958 |
| 2,913,883 | Burgess | Nov. 24, 1959 |